(12) United States Patent
Nanri et al.

(10) Patent No.: US 10,838,188 B2
(45) Date of Patent: Nov. 17, 2020

(54) OPTICAL TWEEZERS DEVICE

(71) Applicant: JTEKT CORPORATION, Osaka-shi, Osaka (JP)

(72) Inventors: Kota Nanri, Nara (JP); Toshiyuki Saito, Kashiba (JP); Kensuke Suzuki, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 429 days.

(21) Appl. No.: 15/769,383

(22) PCT Filed: Oct. 21, 2016

(86) PCT No.: PCT/JP2016/081225
§ 371 (c)(1),
(2) Date: Apr. 19, 2018

(87) PCT Pub. No.: WO2017/069228
PCT Pub. Date: Apr. 27, 2017

(65) Prior Publication Data
US 2018/0307026 A1      Oct. 25, 2018

(30) Foreign Application Priority Data
Oct. 22, 2015    (JP) ................................. 2015-207923

(51) Int. Cl.
*G02B 27/00*      (2006.01)
*G02B 3/00*       (2006.01)
(Continued)

(52) U.S. Cl.
CPC ................ *G02B 21/32* (2013.01); *B25J 7/00* (2013.01); *G02B 21/26* (2013.01)

(58) Field of Classification Search
CPC ........ G02B 21/32; G02B 21/26; G02B 6/262; B25J 7/00; G01N 5/10; G01N 2015/1006
See application file for complete search history.

(56) References Cited

U.S. PATENT DOCUMENTS

| 6,991,906 B1 | 1/2006 | Fuhr et al. |
| 2003/0117572 A1 | 6/2003 | Kanayama et al. |

(Continued)

FOREIGN PATENT DOCUMENTS

| CN | 101738164 A | 6/2010 |
| JP | H06-075170 A | 3/1994 |

(Continued)

OTHER PUBLICATIONS

Apr. 3, 2020 Chinese Office Action issued in Chinese Patent Application No. 201680061609.7.

(Continued)

*Primary Examiner* — Alicia M Harrington
(74) *Attorney, Agent, or Firm* — Oliff PLC

(57) ABSTRACT

An optical tweezers device includes: an acquisition unit which acquires basic movement information indicating a movement of a stage; a conversion unit which converts the movement of the stage indicated by the basic movement information into a movement of a particle being trapped and generates converted movement information indicating the movement of the particle; and a distance calculation unit which determines a distance between the particle being trapped by the laser beam and a focal point of the lens. The conversion unit generates the converted movement information by correcting the movement of the particle using the distance determined by the distance calculation unit.

4 Claims, 5 Drawing Sheets

(51) Int. Cl.
  *G02B 21/32*   (2006.01)
  *G02B 21/26*   (2006.01)
  *B25J 7/00*    (2006.01)

(56)            References Cited

U.S. PATENT DOCUMENTS

| | | |
|---|---|---|
| 2007/0139784 A1 | 6/2007 | Roichman et al. |
| 2008/0094675 A1 | 4/2008 | Roichman et al. |
| 2009/0146050 A1 | 6/2009 | Roichman et al. |
| 2010/0288914 A1 | 11/2010 | Roichman et al. |
| 2012/0057213 A1 | 3/2012 | Roichman et al. |
| 2012/0068059 A1* | 3/2012 | Montes Usategui .. G02B 21/32 250/251 |

FOREIGN PATENT DOCUMENTS

| | | |
|---|---|---|
| JP | 2003-186024 A | 7/2003 |
| JP | 2006-235319 A | 9/2006 |
| JP | 2006-296361 A | 11/2006 |
| JP | 2009-518688 A | 5/2009 |
| JP | 2011-072732 A | 4/2011 |
| WO | 99/34653 A1 | 7/1999 |

OTHER PUBLICATIONS

Li Yinmei et al., "Progress in Optical Tweezers Technology", Chinese Journal of Lasers, Jan. 2015, vol. 42, No. 1, China Academic Journal Electronic Publishing House, China, pp. 1-20.
Jan. 24, 2017 International Search Report issued in Patent Application No. PCT/JP2016/081225.

* cited by examiner

OPTICAL TWEEZERS DEVICE

TECHNICAL FIELD

An aspect of the present invention relates to an optical tweezers device.

BACKGROUND ART

The optical tweezers technology is known which is a technology for trapping, for example, a particle measuring about 1 μm and, furthermore, moving it (refer to Patent document 1, for example). According to the optical tweezers technology, a laser beam is focused with a lens and a particle that is brought close to a focusing point is trapped by optical pressure acting on it. The optical tweezers technology makes it possible to continue to trap a particle by, for example, causing the particle to exist in a liquid, producing a refractive index difference between the particle and liquid around it, and directing the total force of optical pressure acting on the particle to the focusing point.

To trap a particle utilizing the optical tweezers technology described above, it is necessary that the particle have transmittivity (transmit the laser beam) and that the refractive index (n2) of the particle is larger than the refractive index (n1) of liquid around it (n2>n1).

PRIOR ART DOCUMENT(S)

Patent Document(s)

Patent Document 1: JP-A-2006-235319

SUMMARY OF THE INVENTION

Problem To Be Solved By The Invention

In optical tweezers devices of the above kind, a particle trapped by a laser beam can be moved by moving the focusing point of the laser beam (the focal point of the lens). This may be done by, for example, translating the laser beam by combining plural acousto-optic modulators. However, this results in problems that the overall device becomes expensive and a very wide space is necessary to install component devices.

In view of the above, a mechanism has been proposed that, instead of moving the focusing point of the laser beam, moves a stage that is mounted with a holding member such as a prepared slide that holds a particle to be trapped and thereby moves what surrounds the particle being trapped by the laser beam relative to the particle.

In an optical tweezers device having such a mechanism, when a particle being trapped is imaged by an imaging means (camera), motion of the particle (a movement relative to its neighborhood) is output on a monitor as, for example, a moving image, and an operator observes the moving image, the operator should see that an untrapped particle etc. that exist around the particle being trapped move whereas the particle being trapped is displayed on the screen so as not to move.

Thus, the operator cannot follow a movement of the particle being trapped. Even if a movement of the particle is observed by watching a moving image, there is no clear reference position and a movement locus of the particle is unknown. If there exists an untrapped particle around the particle being trapped, a relative movement of the particle being trapped can be recognized because the untrapped particle moves with respect to the particle being trapped. However, if there does not exist any other particle (not to be trapped) around the particle being trapped, it is unknown at all whether the particle being trapped is moving.

As such, optical tweezers devices that employ the mechanism of moving the stage while fixing the focusing point of the laser beam cannot be used suitably as, for example, a measurement tool that traps and moves a particle.

An object of an aspect of the invention is therefore to make it possible to perform processing so as to produce an image in which a particle being trapped appears as if it were moving even in an optical tweezers device that employs a mechanism of moving a stage while fixing the focusing point of the laser beam.

Means for Solving the Invention

To attain the above object, an optical tweezers device according to an aspect of the invention includes: a light source which emits a laser beam; a lens which focuses the laser beam emitted from the light source; a device base on which the light source and the lens are mounted; a stage which is disposed on the device base so as to be movable and to be able to support a holding member which holds a particle to be trapped by the focused laser beam; a drive unit which moves the stage; an acquisition unit which acquires basic movement information indicating a movement of the stage caused by the drive unit; a conversion unit which converts the movement of the stage indicated by the basic movement information into a movement of the particle being trapped and generates converted movement information indicating the movement of the particle; and a distance calculation unit which determines a distance between the particle being trapped by the laser beam and a focal point of the lens, wherein the conversion unit generates the converted movement information by correcting the movement of the particle using the distance determined by the distance calculation unit.

In the configuration according to the aspect of the invention, the focusing point of the laser beam is fixed and the stage is moved. In actuality, things other than the particle being trapped are moved relative to the particle. However, processing can be performed so as to produce a virtual movement of the particle by converting the movement of the stage into a movement of the particle being trapped. As the holding member which is mounted on the stage moves, the particle being trapped by the laser beam follows the focal point of the lens. However, there may occur a case that the center of the particle does not coincide with the focal point of the lens. In view of this, a distance between the particle being trapped and the focal point of the lens is determined. And the movement of the particle is corrected using the determined distance and converted movement information indicating a movement of the particle is generated. This makes it possible to output, accurately, how the particle moves. In this manner, with the mechanism that the focusing point of the laser beam is fixed and the stage is moved, it becomes possible to perform processing so as to produce a virtual movement of a particle being trapped by the laser beam.

The optical tweezers device may further include: an imaging unit which acquires an image of a region, including the particle and its neighborhood, in the holding member; and an output unit which outputs a virtual image in which the particle being trapped appears as if it were moving on the basis of the converted movement information generated by the conversion unit.

This allows an operator to recognize, intuitively, a movement locus, for example, of the particle as a manner of its movement.

The optical tweezers device may further include a strain gauge which detects a movement distance of the stage, the drive unit has a mechanism that uses deformation of the piezoelectric element as motive power for moving the stage, and the acquisition unit determines the movement distance of the stage to be included in the basic movement information on the basis of a detection signal of the strain gauge.

In this case, a movement of the stage can be detected accurately by the strain gauge and the stage can be moved at a high resolution by the mechanism including the piezoelectric element.

Advantage of the Invention

The aspect of the invention makes it possible to perform processing so as to produce and image in which a particle being trapped appears as if it were moving by the laser beam were moving even in an optical tweezers device that employs a mechanism of moving a stage while fixing the focusing point of the laser beam.

MODE FOR CARRYING OUT THE INVENTION

Figure 1:
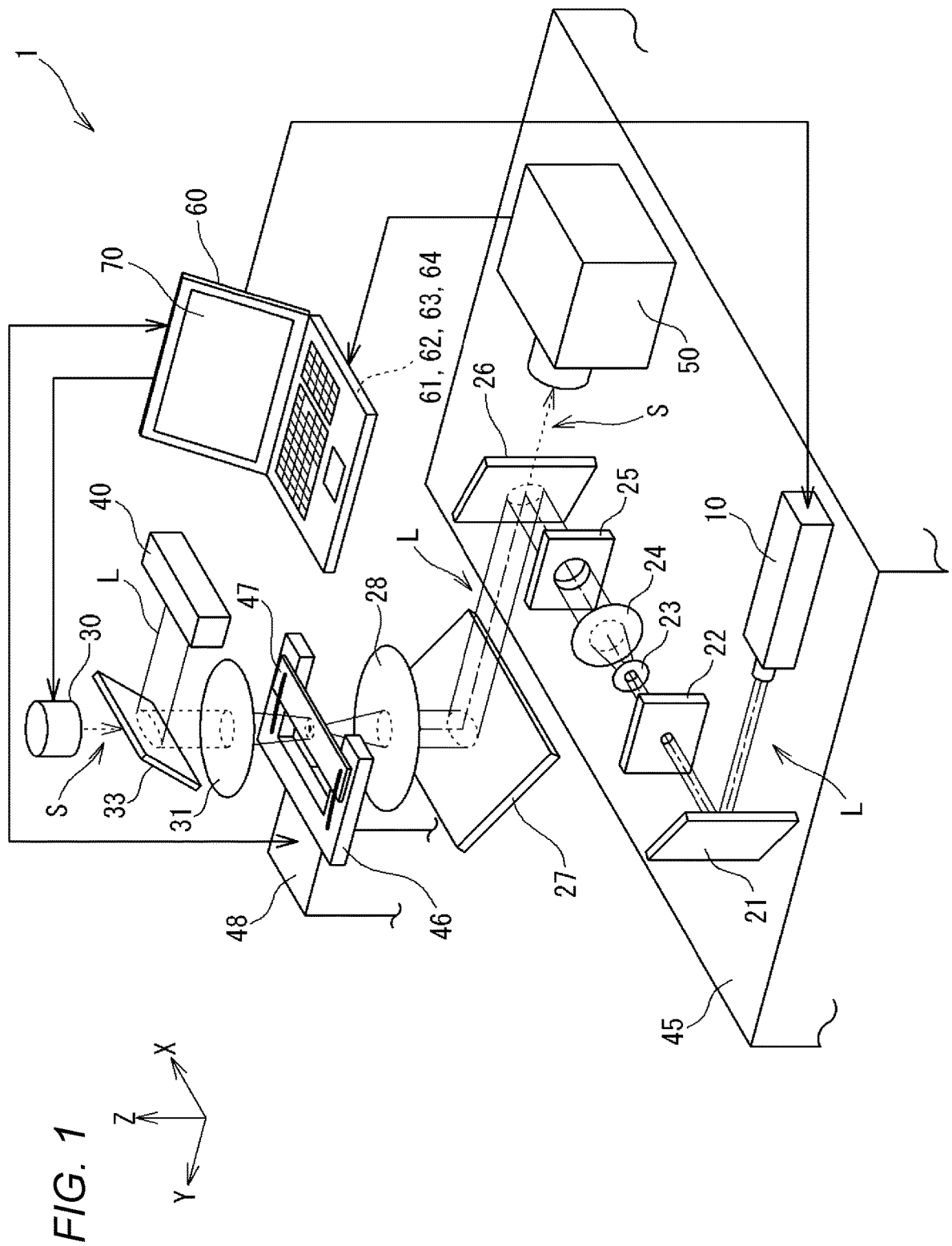
FIG. 1 is an explanatory diagram for description of the overall configuration of an optical tweezers device.

An embodiment of the present invention will be hereinafter described on the basis of the drawings FIG. 1 is an explanatory diagram for description of the overall configuration of an optical tweezers device 1. The optical tweezers device 1 includes a light source 10 of a laser beam, light guiding means (21-27), a first lens 28, an illumination light source 30, a second lens 31, a mirror (third mirror) 33, a detector 40, a device base 45, a stage 46, a drive means 48, an imaging means 50, and a control means 60.

As described later, the optical tweezers device 1 is configured in such a manner that the stage 46 can be moved by the drive means 48 with respect to the device base 45 which is fixed to a working floor. And other devices, that is, the light source 10, the lenses 28 and 31, the detector 40, the imaging means 50, etc., are fixed to the device base 45 and are not moved with respect to the device base 45.

The light source 10 of the laser beam, which is a laser device for emitting the laser beam L, emits the laser beam L having a first wavelength according to a control signal received from the control means 60. A particle being held by a holding member (e.g., prepared slide) 47 mounted on the stage 46 is trapped by an optical tweezers technique using the laser beam L (optical trap).

The light guiding means (21-27) serve to guide the laser beam L emitted from the light source 10 to the first lens 28. The light guiding means (21-27) will be described below in order.

A first reflection mirror 21 reflects the laser beam L coming from the light source 10 so that it is incident on a first aperture 22. The first aperture 22 narrows the diameter of the incident laser beam L and outputs resulting light toward a first collimating lens 23. The first collimating lens 23 enlarges the diameter of the laser beam L and outputs resulting light toward a second collimating lens 24. The second collimating lens 24 converts the diameter-enlarged laser beam L into parallel light and outputs it to a second aperture 25. The second aperture 25 narrows the diameter of the parallel laser beam L and outputs resulting light toward a first mirror 26. The first mirror 26 reflects the incident laser beam L toward a second mirror 27. The second mirror 27 reflects the incident laser beam L toward the first lens 28.

The first lens 28 focuses the laser beam L coming from the second mirror 27 at a focal point that is set in the holding member 47. A particle that is brought close to the focusing point (the focal point of the lens 28) can be trapped by the laser beam L focused by the lens 28. The focused laser beam L is incident on the second lens 31 after passing through the particle. The laser beam L incident on the second lens 31 after passing through the particle is output toward the third mirror 33, is reflected by the third mirror 33, and is incident on the detector 40. The mirrors 33 and 26 transmit illumination light S coming from the illumination light source 30.

The illumination light source 30, which is, for example, an LED illumination device, emits illumination light S having a second wavelength according to a control signal received from the control means 60. The illumination light S serves as illumination light for the imaging means 50 for observing a state of a particle being held by the holding member 47. The illumination light S passes through the third mirror 33, is focused by the second lens 31, thereafter passes through the first lens 28, is reflected by the second mirror 27, passes through the first mirror 26, and reaches the imaging means 50.

The holding member 47 for holding a particle is mounted on the stage 46. A fluid W and a particle C1 to be trapped that is contained in the fluid W are held by the holding member 47 (see FIG. 3). The fluid W contains particles C2 not to be trapped. In the embodiment, the fluid W is a liquid. The refractive index (n1) of the fluid is smaller than the refractive index (n2) of the particle C (n1<n2).

As described above, the holding member 47 moves together with the stage 46 relative to the lens 28, whereby the particles C2 not to be trapped move relative to the particle C1 to be trapped.

The stage 46 is supported so as to be movable in the front-rear direction, the left-right direction, and the top-bottom direction, and the drive means 48 moves the stage 46 in the front-rear direction, the left-right direction, and the top-bottom direction. In FIG. 1, the X-axis direction, the Y-axis direction, and the Z-axis direction are defined as the front-rear direction, the left-right direction, and the top-bottom direction, respectively. It suffices that the drive means 48 be configured so as to move the stage 46 in at least one of the X-axis direction, the Y-axis direction, and the Z-axis direction according to a control signal received from the control means 60 and thereby moves the holding member 47 in the same direction.

Figure 2:
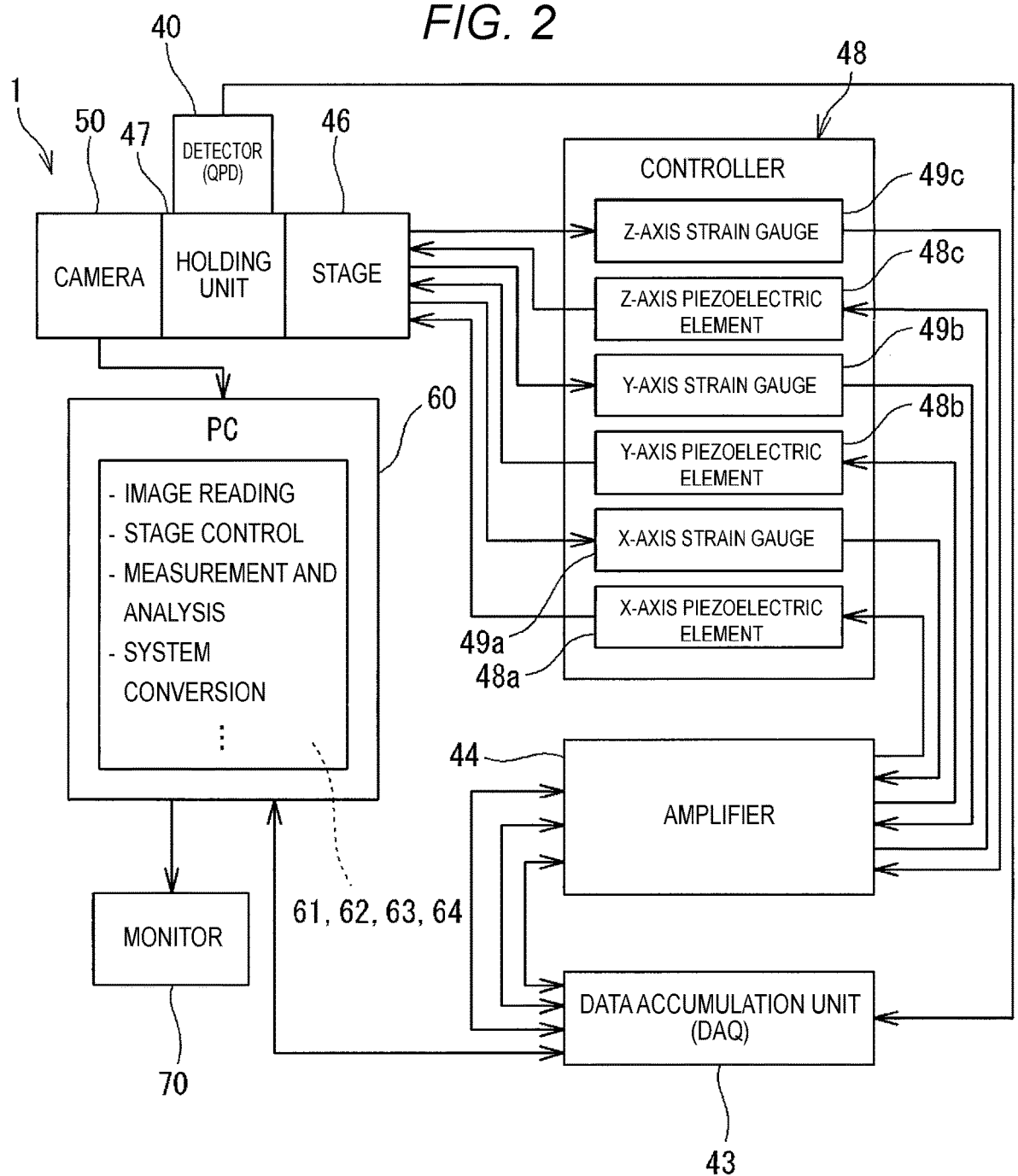
FIG. 2 is a block diagram showing devices of the optical tweezers device shown in FIG. 1.

FIG. 2 is a block diagram showing devices of the optical tweezers device shown in FIG. 1. The drive means 48 consist of actuators using a piezoelectric element, for example. As shown in FIG. 2, the drive means 48 has a piezoelectric element 48a for moving the stage 46 in the X-axis direction, a piezoelectric element 48b for moving the stage 46 in the Y-axis direction, a piezoelectric element 48c for moving the stage 46 in the Z-axis direction. The stage 46 can be moved in each direction as a result of deformation, in a prescribed axial direction, of a corresponding one of the piezoelectric elements 48a, 48b, and 48c that is caused according to a control signal (control voltage) received from the control means 60.

The optical tweezers device 1 is also equipped with sensors for detecting a movement of the stage 46. In the embodiment, strain gauges, that is, a strain gauge 49a for detecting a movement distance of the stage 46 in the X-axis direction, a strain gauge 49b for detecting a movement distance of the stage 46 in the Y-axis direction, a strain gauge 49c for detecting a movement distance of the stage 46 in the Z-axis direction, are provided as the sensors.

Detection signals (voltage signals) that are output from the strain gauges 49a, 49b, and 49c are amplified by an amplifier 44 and collected by a data accumulation unit (DAQ) 43 which functions in cooperation with the control means 60 which is a computer.

The following description will be made of a case that the stage 46 is moved toward the positive side in the Y-axis direction in the XY plane (see FIG. 1). In this case, the strain gauge 49c for detection in the Z-axis direction may be omitted.

Figure 3:
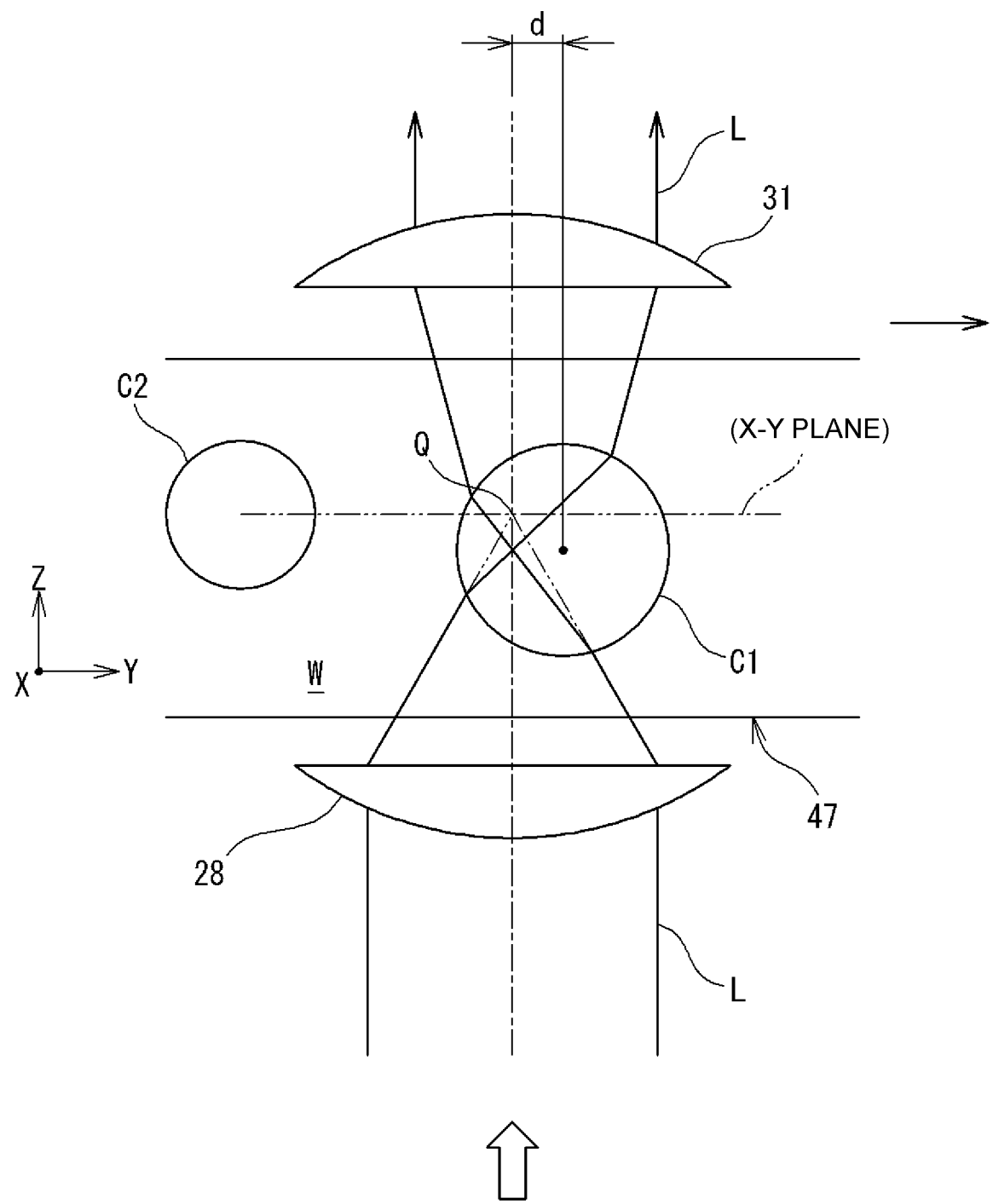
FIG. 3 is an explanatory diagram showing a particle to be trapped, lenses, etc.
Figure 4:
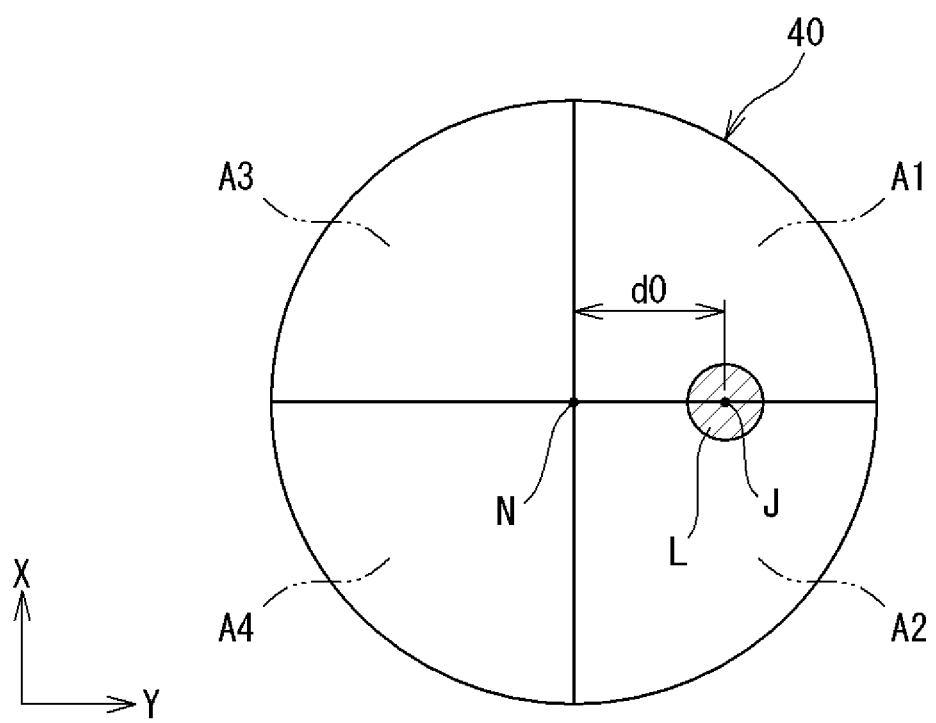
FIG. 4 is an image diagram for description of the function of a detector.

Referring to FIG. 1, the detector 40 is a position detector for detecting an incident position of the laser beam L with respect to a reference position; in the embodiment, the detector 40 is a quadrant position detector. FIG. 4 is an image diagram for description of the function of the detector 40. The detector 40 has photodetection units A1, A2, A3, and A4 obtained by dividing a flat surface into plural (four) portions. FIG. 3 is an explanatory diagram showing the particle C1 to be trapped, the lens 28, etc. Coordinates in the XY plane including the focal point Q of the lens 28 (see FIG. 3) are correlated with XY-plane coordinates of the photodetection units A1, A2, A3, and A4 (see FIG. 4), and the position of the focal point Q of the lens 28 corresponds to a reference position N located at the center of the photodetection units A1, A2, A3, and A4. Each of the photodetection units A1, A2, A3, and A4 outputs a detection signal (voltage signal) corresponding to a receiving position J of the laser beam L.

Since as mentioned above the holding member 47 including the particle C1 being trapped is moved toward the positive side in the Y-axis direction with respect to the lens 28 (see FIG. 3), the particle C1 is moved relative to the untrapped particle C2 toward the negative side in the Y-axis direction (in the direction opposite to the movement direction of the holding member 47) so as to follow the focal point Q of the lens 28.

Thus, the laser beam L that reaches the photodetection units A1, A2, A3, and A4 after being emitted from the light source 10 and passing through the particle C1 being trapped is detected at a position that is deviated in the Y-axis direction from the reference position N (see FIG. 4) corresponding to the position of the focal point Q of the lens 28 by a distance d0.

The distance d0 (V) means the distance d (m) (see FIG. 3) between the center position of the particle C1 being trapped by the laser beam L and the focal point Q of the lens 28. That is, detection signals (voltage signals) to be used for determination of distances d between the particle C1 being trapped and the focal point Q of the lens 28 are output from the detector 40 one after another. These detection signals are input to the data accumulation unit 43 and processed by a distance calculation unit 61 (see FIG. 1) provided in the control means 60 (described later), whereby distances d between the particle C1 being trapped and the focal point Q of the lens 28 are determined one after another. These distances d are values in the XY plane. The distance d also varies because the distance d0 varies depending on the movement velocity of the stage 46.

The imaging means 50 shown in FIG. 1, which is a CCD camera or a CMOS camera, for example, images a region including the focusing point and its neighborhood. The imaging means 50 outputs image information produced by imaging to the control means 60. The imaging means 50 can acquire an image obtained by shooting the inside of the holding member 47 from the Z-axis direction, and the acquired image is a two-dimensional image in the XY plane. Even if each particle does not exist in the XY plane completely in the holding member 47, the particle is recognized as an image projected on the XY plane.

The control means 60, which is, for example, a computer that is equipped with a processor and a memory, is provided with the above-mentioned function of outputting control signals, a function of processing each of pieces of information (each of signals) collected by the data accumulation unit 43, a function of taking in image information from the imaging unit 50 and generating new image information, and a function of outputting various kinds of information. The control means 60 is also equipped with the distance calculation unit 61, an acquisition unit 62, a conversion unit 63, and an image generation unit 64 as function units that are implemented by the processor's running computer programs that are stored in the memory of the computer. These function units can process each of pieces of information (each of signals) collected by the data accumulation unit 43. The optical tweezers device 1 according to the embodiment is further equipped with a monitor (output means) 70 for outputting, as an image, image information generated through processing by the control means 60.

The distance calculation unit 61 determines, through calculation, a distance d (see FIG. 3) between the particle C1 being trapped by the laser beam L and the focal point Q of the lens 28 on the basis of a detection signal (voltage signal) received from the detector 40. Calculation of a distance d that is performed by the detector 40 and the distance calculation unit 61 can be performed by means that are used conventionally in the optical tweezers technology.

The acquisition unit 62 can determine a movement distance of the stage 46 in the X-axis direction on the basis of a detection signal received from the strain gauge 49a whose detection direction is the X-axis direction, and can determine a movement distance of the stage 46 in the Y-axis direction on the basis of a detection signal received from the strain gauge 49b whose detection direction is the Y-axis direction. The acquisition unit 62 discriminates between the X-axis direction and the Y-axis direction for movement of the sage 46 by acquiring detection signals of the two strain gauges 49a and 49b with discrimination between them. Thus, the acquisition unit 62 acquires a movement direction and a movement distance in that movement direction in such a manner that they are correlated with each other. In this manner, the acquisition unit 62 can acquire basic movement information indicating a direction and a distance of a movement of the stage 46 caused by the drive means 48.

The basic movement information includes information indicating a movement direction of the stage 46 and information indicating a movement distance in that movement direction. In the embodiment, since as mentioned above the stage 46 is moved with respect to the lens 28 in a direction that is parallel with the XY plane, the conversion unit 63 performs processing of converting the movement direction of the stage 46 and the movement distance in that movement direction into a movement direction of the focusing point of the lens 28 (or the laser beam) and a movement distance in that movement direction on the basis of the basic movement information.

More specifically, in the embodiment, in actuality, the stage 46 has been moved toward the positive side in the Y-axis direction by a movement distance Δy with respect to the fixed focusing point of the lens 28 (or the laser beam) and this manner of movement has been acquired by the acquisition unit 62 as the basic movement information. Thus, the conversion unit 63 generates, on the basis of the basic movement information, information (hereinafter referred to as "pre-correction movement information") indicating that the focusing point of the lens 28 (or the laser beam) has been moved virtually with respect to the stage 46 by the movement distance Δy toward the negative side in the Y-axis direction. That is, the conversion unit 63 generates pre-correction movement information indicating that the focusing point of the lens 28 (or the laser beam) has been moved by the same movement distance indicated by the basic movement information in the direction opposite to the movement direction indicated by the basic movement information.

In actuality, although as shown in FIG. 3 the particle C1 being trapped by the laser beam L follows the focal point Q of the lens 28 when the holding member 47 mounted on the stage 46 is moved, there may occur a case that the center of the particle C1 does not coincide with the focal point Q of the lens 28. In particular, the center of the particle C1 does not coincide with the focal point Q of the lens 28 in a case that the movement velocity of the stage 46 (holding member 47) is high or the movement velocity variation rate is high.

On the other hand, the generated pre-correction movement information is information indicating the direction and the distance of the movement of the focusing point of the lens 28 (or the laser beam) with respect to the stage 46. Thus, if the movement distance itself of the focusing point of the lens 28 (or the laser beam) indicated by the pre-correction movement information is regarded as a movement distance of the particle C1, there occurs a difference between the center position of the particle C1 and the focal point Q of the lens 28, that is, an error in the above-mentioned distance d.

In view of the above, the conversion unit 63 corrects the movement distance contained in the pre-correction movement information and generates converted movement information indicating a movement direction of the particle C1 and a corrected movement distance in that movement direction. The information indicating the movement direction contained in the converted movement information is the same as that contained in the pre-correction movement information.

The above correction is performed using the distance d determined by the distance calculation unit 61. More specifically, since as shown in FIG. 3 the particle C1 is trapped while following the focal point Q of the lens 28 in such a manner as to be distant (i.e., delayed in the movement direction) from the focal point Q by the distance d, the conversion unit 43 performs a calculation of subtracting the distance d determined by the distance calculation unit 61 from the movement distance Δy indicated by the pre-correction movement information. As a result, a virtual (relative) movement distance of the particle C1 being trapped is obtained.

As described above, the conversion unit 63 converts, virtually, a movement of the stage 46 indicated by the basic movement information into a movement of the particle C1 being trapped and generates converted movement information indicating the movement of the particle C1. In doing so, the conversion unit 63 corrects the movement of the particle C1 being trapped using the distance d determined by the distance calculation unit 61 and thereby generates converted movement information indicating the movement direction of the particle C1 and a movement distance in that movement direction.

In the optical tweezers device 1 according to the embodiment which, as mentioned above, is equipped with the imaging means (camera) 50, an image including the particle C1 being trapped and its neighborhood is acquired and information of that image is acquired by the control means 60.

The image generation unit 64 which is one of the function units of the control means 60 generates converted image information for output on the monitor 70 on the basis of the image information acquired by the image means 50 and the converted movement information generated by the conversion unit 63. An image obtained from this image information is an image including the particle C1 being trapped and its neighborhood, and is, for example, a virtual image that is a combination of a background image that is an image that was acquired by the imaging means 50 before the movement and from which the particle C1 being trapped is excluded and a manner of movement of the particle C1 that is obtained from the converted movement information.

Figure 5A:
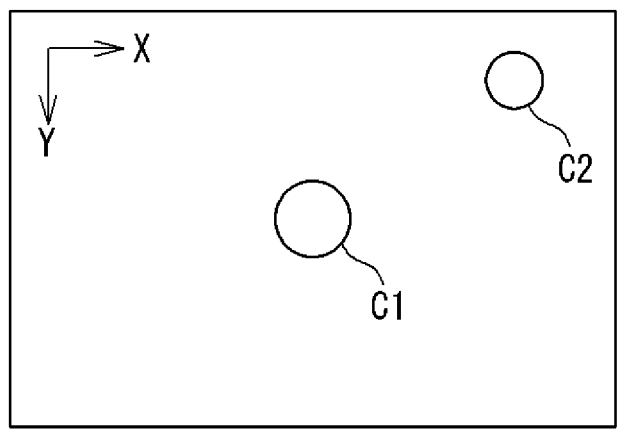
FIGS. 5(A)-5(C) are explanatory diagrams of images that are output on a monitor.
Figure 5B:
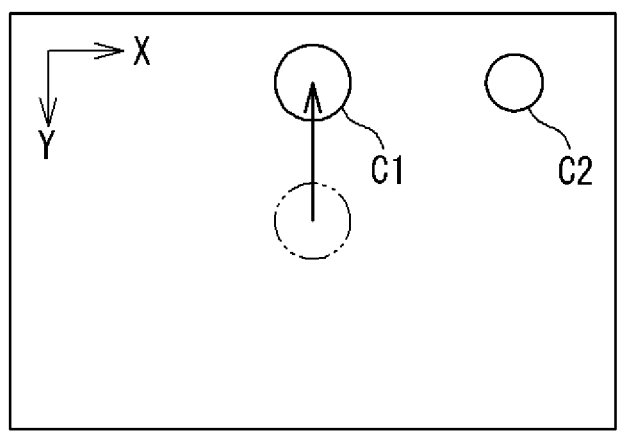

FIGS. 5(A) and 5(B) are explanatory diagrams of images that are output on the monitor 70 on the basis of the image information generated on the basis of the converted movement information. FIG. 5(A) shows a state that the particle C1 is trapped and is at a standstill (the stage 46 has not been moved yet).

Figure 5C:
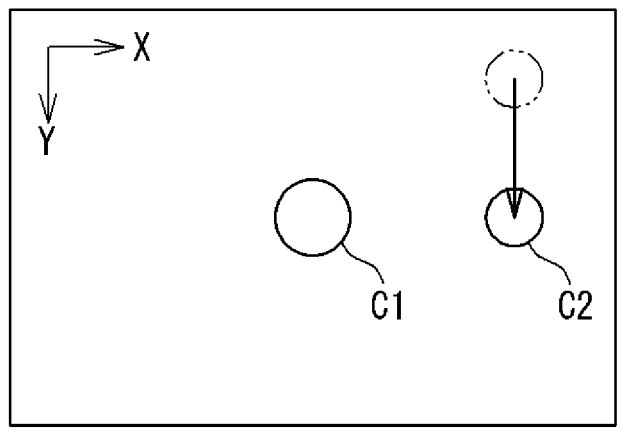

If the above-described conversion processing were not performed, an image (moving image) that is obtained when the stage 46 is moved being driven by the drive means 48 would be such that as shown in FIG. 5(C) an untrapped particle C2 adjacent to the particle C1 being trapped is moved with respect to it in the Y-axis direction.

In contrast, in the embodiment, as described above, the conversion unit 63 generates converted movement information. On the basis of the converted movement information, the image generation unit 64 of the control means 60 generates virtual image information (moving image information) by converting the movement of the stage 46 into a movement of the particle C1 being trapped. The control means 60 causes the monitor 70 to output this image information as shown in FIG. 5(B). That is, an image in which the particle C1 being trapped moves whereas the untrapped particle C2 adjacent to the particle C1 is kept at a standstill rather than moves is output on the monitor 70.

More specifically, an image is output in which the particle C1 being trapped moves in the Y-axis direction with respect to its neighborhood (because the movement direction information contained in the converted movement information is information indicating the Y-axis direction) by a movement distance (Δy−d) (because the information of the movement distance, contained in the converted movement information, in the above movement direction is information indicating a movement distance (Δy−d) as corrected by a distance d).

The symbols, the arrows indicating the movements of the particles, the virtual lines (two-dot chain lines) indicating the particles before the movements, etc. that are shown in FIGS. 5(A)-5(C) are just for description and are not included in the images that are output on the monitor 70.

The optical tweezers device 1 performs controls for causing the above-described pieces of processing, that is, the detection of a distance d0 (see FIG. 4) by the detector 40, the acquisition of a distance d (see FIG. 3) on the basis of the distance d0 by the distance calculation unit 61, the acquisition of basic movement information indicating a movement of the stage 46 by the acquisition unit 62, the correction and the generation of converted movement information by the conversion unit 63, the generation of image information by the image generation unit 64, the output of the image information on the monitor 70, are repeated as time elapses.

Although the optical tweezers device 1 according to the embodiment is configured as described above, the light guiding means (21-27) shown in FIG. 1, for example, may have another configuration. That is, the optical tweezers device 1 is equipped with the light source 10 for emitting the laser beam L, the lens 28 for focusing the laser beam L emitted from the light source 10, the device base 45 which is mounted with the light source 10, the lens 28, etc., the stage 46 which is disposed on the device base 45 so as to be movable and to be able to support the holding member 47 for holding a particle C1 to be trapped by the focused laser beam L, the drive means 48 for moving the stage 46, and the control means 60 (computer) for performing various kinds of processing.

The distance calculation unit 61 of the control means 60 determines a distance d between a particle C1 being trapped by the laser beam L and the focal point Q of the lens 28. The acquisition unit 62 of the control means 60 acquires basic movement information indicating a movement (movement distance and movement direction) caused by the drive means 48, and the conversion unit 63 converts the movement of the stage 46 indicated by the basic movement information into a movement of the particle C1 being trapped and thereby generates converted movement information indicating the movement of the particle C1. The converted movement information generated by the conversion unit 63 indicates a movement of the particle C1 being trapped as corrected using the distance d determined by the distance calculation unit 61.

As described above, the optical tweezers device 1 according to the embodiment is configured in such a manner that the focusing point of the laser beam L (the focal point Q of the lens 28) is fixed and the stage 46 is moved. In actuality, things other than the particle C1 being trapped are moved relative to the particle C1. However, processing is performed so as to produce a virtual movement of the particle C1, that is, the functions of the control means 60 converts the movement of the stage 46 into a movement of the particle C1 being trapped by the laser beam L.

As the holding member 47 which is mounted on the stage 46 moves, the particle C1 being trapped by the laser beam L follows the focal point Q of the lens 28. However, there may occur a case that the center of the particle C1 does not coincide with the focal point Q of the lens 28. In view of this, in the embodiment, a distance d between the particle C1 being trapped and the focal point Q of the lens 28 is determined. The movement of the particle C1 is corrected using the distance d and converted movement information indicating a movement of the particle C1 is generated. This makes it possible to output, accurately, how the particle C1 moves. More specifically, a movement (locus) of the particle C1 being trapped can be visualized.

More specifically, the imaging means 50 acquires an image of a region, including the particle C1 and its neighborhood, in the holding member 47. The monitor 70 outputs a virtual image in which the particle C1 being trapped appears as if it were moving (see FIGS. 5(A) and 5(B)) on the basis of the converted movement information generated by the conversion unit 63. This allows an operator to recognize, intuitively, a movement locus, for example, of the particle C1 as a manner of its movement.

For observation through the monitor 70, the image generation unit 64 makes a setting that a prescribed position of an image displayed on the monitor 70 (e.g., the center of the monitor 70) is made a reference point. It is preferable that the image generation unit 64 generate image information in which this reference point is fixed. This makes it easier to control a movement of the stage 46 so that the particle C1 being trapped is returned to its original position in an image. The movement can be facilitated also in a case that the stage 46 is moved manually. For example, where the center of the particle C1 being trapped (the focal point Q of the lens 28) is set coincident with the image center of the monitor 70 (reference point) at the beginning, the particle C1 can be returned to the reference point easily even after it has been moved randomly (in actuality, the stage 46 has been moved parallel with the XY plane).

In the embodiment, as described above, the drive means 48 for moving the stage 46 has the piezoelectric elements 48a, 48b, and 48c and employs the mechanism that uses deformation of each of the piezoelectric elements 48a, 48b, and 48c to produce motive power for moving the stage 46. The optical tweezers device 1 is further equipped with the strain gauges 49a, 49b, and 49c for detecting a movement distance of the stage 46. The acquisition unit 62 which is one of the function units of the control means 60 determines a movement distance of the stage 46 to be included in the basic movement information on the basis of detection signals of the strain gauges 49a, 49b, and 49c. This configuration makes it possible to control a movement of the stage 46 at a high resolution by performing a feedback control using detection signals of the strain gauges 49a, 49b, and 49c.

The embodiment disclosed above is illustrative and is not restrictive in every point. That is, the optical tweezers device according to the invention is not limited to the one in the illustrated embodiment and may be one in any other embodiment within the scope of the invention.

The movement distance information in each of the basic movement information, pre-correction movement information, and converted movement information may be a dimension value, it may be the number of pixels so as to be compatible with information handled in the imaging means 50 and the monitor 70.

Although the above embodiment has been described for the case that a manner of movement of the particle C1 is output on the monitor 70 in the form of a moving image on the basis of converted movement information, it may be output in a manner in which another means is used; it may be output in the form of a graph or numerical values. The above-described optical tweezers device 1 can be applied to various kinds of measurements and observations, and can be applied to a flow velocity measurement in micro-PIV (particle image velocimetry).

The present application is based on Japanese Patent Application No. 2015-207923 filed on Oct. 22, 2015, the disclosure of which is incorporated herein by reference.

DESCRIPTION OF REFERENCE SIGN(S)

10: Light Source
28: Lens
45: Device Base
46: Stage
47: Holding Member

48: Drive Means
48a, 48b, 48c: Piezoelectric Element
49a, 49b, 49c: Strain Gauge
50: Imaging Means
60: Control Means
61: Distance Calculation Unit
62: Acquisition Unit
63: Conversion Unit
64: Image Generation Unit
70: Monitor (Output Means)
d: Distance
C: Particle
L: Laser Beam

The invention claimed is:

1. An optical tweezers device comprising:
a light source which emits a laser beam;
a lens which focuses the laser beam emitted from the light source;
a device base on which the light source and the lens are mounted;
a stage which is disposed on the device base so as to be movable and to be able to support a holding member which holds a particle to be trapped by the focused laser beam;
a drive unit which moves the stage;
an acquisition unit which acquires basic movement information indicating a movement of the stage caused by the drive unit;
a conversion unit which converts the movement of the stage indicated by the basic movement information into a movement of the particle being trapped and generates converted movement information indicating the movement of the particle; and
a distance calculation unit which determines a distance between the particle being trapped by the laser beam and a focal point of the lens,
wherein the conversion unit generates the converted movement information by correcting the movement of the particle using the distance determined by the distance calculation unit.

2. The optical tweezers device according to claim 1, further comprising:
an imaging unit which acquires an image of a region, including the particle and its neighborhood, in the holding member; and
an output unit which outputs a virtual image in which the particle being trapped appears as if it were moving on the basis of the converted movement information generated by the conversion unit.

3. The optical tweezers device according to claim 2, further comprising:
a strain gauge which detects a movement distance of the stage,
wherein the drive unit has a mechanism that uses deformation of the piezoelectric element as motive power for moving the stage, and
wherein the acquisition unit determines the movement distance of the stage to be included in the basic movement information on the basis of a detection signal of the strain gauge.

4. The optical tweezers device according to claim 1, further comprising:
a strain gauge which detects a movement distance of the stage,
wherein the drive unit has a mechanism that uses deformation of the piezoelectric element as motive power for moving the stage, and
wherein the acquisition unit determines the movement distance of the stage to be included in the basic movement information on the basis of a detection signal of the strain gauge.

* * * * *